(12) United States Patent
Juriasingani

(10) Patent No.: US 10,872,161 B2
(45) Date of Patent: Dec. 22, 2020

(54) PRINTER IDENTITY AND SECURITY

(71) Applicant: Entrust Corporation, Shakopee, MN (US)

(72) Inventor: Rajesh K. Juriasingani, Shakopee, MN (US)

(73) Assignee: ENTRUST CORPORATION, Shakopee, MN (US)

( * ) Notice: Subject to any disclaimer, the term of this patent is extended or adjusted under 35 U.S.C. 154(b) by 95 days.

(21) Appl. No.: 15/821,162

(22) Filed: Nov. 22, 2017

(65) Prior Publication Data

US 2018/0144146 A1 May 24, 2018

Related U.S. Application Data

(60) Provisional application No. 62/425,896, filed on Nov. 23, 2016.

(51) Int. Cl.
*G06F 21/60* (2013.01)
*H04L 9/14* (2006.01)
(Continued)

(52) U.S. Cl.
CPC .......... *G06F 21/608* (2013.01); *G06F 3/1222* (2013.01); *G06F 3/1238* (2013.01); *G06F 21/575* (2013.01); *G06F 21/602* (2013.01); *H04L 9/006* (2013.01); *H04L 9/0894* (2013.01); *H04L 9/14* (2013.01); *H04L 9/30* (2013.01);
(Continued)

(58) Field of Classification Search
CPC .... G06F 21/608; G06F 3/1222; G06F 3/1238; G06F 21/575; G06F 21/602; G06F 2221/032; H04L 9/006; H04L 9/0894; H04L 9/14; H04L 9/30; H04L 9/321;
(Continued)

(56) References Cited

U.S. PATENT DOCUMENTS 5,037,216 A * 8/1991 Nubson ............... B41J 2/315
400/120.16
5,239,926 A * 8/1993 Nubson ............... B41J 3/407
101/425

(Continued)

FOREIGN PATENT DOCUMENTS

EP 2933102 A1 10/2015
WO 2017015436 A1 1/2017

OTHER PUBLICATIONS

Extended European Search Report, European Patent Application No. 17874775.4, dated Jun. 16, 2020 (16 pages).
(Continued)

*Primary Examiner* — Shahriar Zarrineh
(74) *Attorney, Agent, or Firm* — Hamre, Schumann, Mueller & Larson, P.C.

(57) ABSTRACT

A system and method for establishing a secure identity for a printing device at the time of manufacturing is provided. The method includes obtaining a first private key for use with a first operation of the printing device and obtaining a second private key for use with a second operation of the printing device. The method also includes loading the first private key into a secure memory portion of the printing device during manufacturing of the printing device, and loading the second private key into the secure memory portion of the printing device during manufacturing of the printing device.

17 Claims, 5 Drawing Sheets

(51) Int. Cl.
  *H04L 9/30* (2006.01)
  *H04L 9/32* (2006.01)
  *H04N 1/44* (2006.01)
  *H04N 1/00* (2006.01)
  *G06F 3/12* (2006.01)
  *G06F 21/57* (2013.01)
  *H04L 9/00* (2006.01)
  *H04L 9/08* (2006.01)

(52) U.S. Cl.
  CPC ............ *H04L 9/321* (2013.01); *H04L 9/3263* (2013.01); *H04N 1/00339* (2013.01); *H04N 1/4433* (2013.01); *G06F 2221/032* (2013.01); *H04N 2201/0082* (2013.01)

(58) Field of Classification Search
  CPC .............. H04L 9/3263; H04N 1/00339; H04N 1/4433; H04N 2201/0082
  USPC ........................................................ 713/193
  See application file for complete search history.

(56) References Cited

U.S. PATENT DOCUMENTS

| | | | | |
|---|---|---|---|---|
| 5,762,431 A * | 6/1998 | Pawelka | ................ | B65H 31/02 400/642 |
| 6,105,493 A * | 8/2000 | Skubic | ................ | B41J 3/387 101/40 |
| 6,314,521 B1 | 11/2001 | Debry | | |
| 6,447,625 B1 * | 9/2002 | Schmid | ................ | B42D 5/027 156/277 |
| 6,567,530 B1 * | 5/2003 | Keronen | ................ | G09C 5/00 382/100 |
| 6,711,677 B1 * | 3/2004 | Wiegley | ................ | H04L 9/3236 713/151 |
| 6,735,484 B1 * | 5/2004 | Lenz | ................ | G05B 23/024 700/275 |
| 6,894,710 B2 | 5/2005 | Suzuki et al. | | |
| 6,899,478 B1 * | 5/2005 | Mucelli | ................ | B41J 2/325 235/449 |
| 7,339,690 B2 * | 3/2008 | Lenz | ................ | G06F 3/1205 235/380 |
| RE40,373 E * | 6/2008 | Heno | ................ | B08B 7/0028 15/256.51 |
| 7,398,972 B2 | 7/2008 | Schuller et al. | | |
| 7,506,159 B2 * | 3/2009 | Shima | ................ | H04L 9/0844 380/258 |
| 7,627,768 B2 * | 12/2009 | Finkelstein | ............ | G06F 21/50 380/28 |
| 8,271,776 B2 * | 9/2012 | Revel | ................ | H04L 63/04 380/277 |
| 9,358,811 B1 * | 6/2016 | Bucci | ................ | B41J 13/12 |
| 2002/0051652 A1 * | 5/2002 | Heno | ................ | B08B 7/0028 399/107 |
| 2002/0073040 A1 * | 6/2002 | Schwartz | ......... | G07B 17/00467 705/62 |
| 2002/0101498 A1 * | 8/2002 | Vuong | ................ | B41J 2/325 347/171 |
| 2003/0014640 A1 * | 1/2003 | Loyd | ................ | G06F 21/608 713/182 |
| 2003/0090712 A1 | 5/2003 | Lenz et al. | | |
| 2003/0105963 A1 * | 6/2003 | Slick | ................ | H04L 9/0825 713/171 |
| 2004/0109568 A1 * | 6/2004 | Slick | ................ | G06F 21/608 380/277 |
| 2005/0082363 A1 * | 4/2005 | Eichler | ................ | G06K 17/00 235/380 |
| 2005/0104281 A1 * | 5/2005 | Stender | ................ | B41J 3/60 271/185 |
| 2005/0139653 A1 * | 6/2005 | Zettler | ................ | G06K 17/00 235/380 |
| 2006/0049253 A1 * | 3/2006 | Butler | ................ | G06F 3/1209 235/432 |
| 2006/0065718 A1 * | 3/2006 | Tsuruta | ................ | G06K 13/103 235/381 |
| 2006/0101448 A1 * | 5/2006 | Shue | ................ | G06F 8/65 717/168 |
| 2006/0271648 A1 * | 11/2006 | Seki | ................ | H04L 61/2015 709/220 |
| 2007/0023068 A1 * | 2/2007 | Helma | ................ | B08B 7/0028 134/6 |
| 2007/0086823 A1 * | 4/2007 | Lodwig | ................ | B41J 3/50 400/208 |
| 2007/0126558 A1 * | 6/2007 | Donato | ................ | G06K 7/0008 340/10.51 |
| 2007/0143618 A1 * | 6/2007 | Sperry | ................ | G06F 21/6209 713/176 |
| 2007/0182984 A1 * | 8/2007 | Ragnet | ................ | G06F 21/608 358/1.15 |
| 2007/0283152 A1 * | 12/2007 | Kudo | ................ | H04L 63/0428 713/168 |
| 2008/0115209 A1 * | 5/2008 | Fontanella | ............ | B42D 25/00 726/19 |
| 2008/0297841 A1 * | 12/2008 | Aoki | ................ | G06F 3/1208 358/1.15 |
| 2008/0316523 A1 * | 12/2008 | Klinefelter | ........... | B41J 2/17546 358/1.14 |
| 2009/0083309 A1 * | 3/2009 | Nehowig | ................ | G06Q 50/04 |
| 2009/0089592 A1 * | 4/2009 | Kudo | ................ | H04L 9/3236 713/193 |
| 2009/0307499 A1 | 12/2009 | Senda | | |
| 2010/0058321 A1 * | 3/2010 | Anderson | ................ | G06F 8/65 717/173 |
| 2010/0289845 A1 * | 11/2010 | Conway | ................ | B41J 3/60 347/16 |
| 2011/0217109 A1 * | 9/2011 | Cronin | ................ | B41J 13/12 400/624 |
| 2012/0286464 A1 | 11/2012 | Takei et al. | | |
| 2013/0121793 A1 * | 5/2013 | Hoffman | ................ | B65H 5/04 414/222.13 |
| 2013/0220984 A1 | 8/2013 | Cronin et al. | | |
| 2014/0071464 A1 * | 3/2014 | Berthaud | ................ | B65H 1/06 358/1.6 |
| 2014/0132967 A1 * | 5/2014 | Higashi | ................ | B41J 35/38 358/1.5 |
| 2014/0164753 A1 | 6/2014 | Lee | | |
| 2014/0185800 A1 * | 7/2014 | Fallon | ................ | G06F 3/1238 380/55 |
| 2014/0345787 A1 | 11/2014 | Zaborowski et al. | | |
| 2014/0380055 A1 * | 12/2014 | Blanchard | ............ | H04L 9/0891 713/171 |
| 2016/0005262 A1 * | 1/2016 | Hirato | ................ | G07F 17/3211 463/31 |
| 2016/0300128 A1 | 10/2016 | Alvig et al. | | |
| 2016/0350903 A1 * | 12/2016 | Cronin | ................ | H04N 5/2257 |
| 2016/0373257 A1 * | 12/2016 | Adrangi | ................ | H04W 12/0401 |
| 2018/0134053 A1 * | 5/2018 | Stangler | ................ | B41J 17/22 |
| 2018/0144146 A1 * | 5/2018 | Juriasingani | ........... | G06F 21/608 |
| 2019/0056897 A1 * | 2/2019 | Balinsky | ................ | G06F 3/1238 |
| 2019/0108517 A1 * | 4/2019 | Rose | ................ | G06Q 20/3829 |

OTHER PUBLICATIONS

International Search Report and Written Opinion issued in PCT/US2017/063074 dated Mar. 6, 2018, 17 pages.
"Secure Boot for QorIQ Communications Processors", QorIQ Communication Platforms, www.freescale.com/QorIQ, © 2011, 2013 document No. QORIQSECBOOTWP Rev 1, 4 pages.

\* cited by examiner

PRINTER IDENTITY AND SECURITY

FIELD

This disclosure relates to a method and system for establishing a unique and secure identity for a printing device at the time of manufacturing.

BACKGROUND

As printing devices become increasing more reliant on interconnectivity with customers, other printing devices, and servers, these printing devices become more open for attack or reconfiguration by unauthorized third parties. Unauthorized access to the printing device can lead to unauthorized access and/or distribution of private customer data. Also, unauthorized reconfiguration of the printing device can cause damage to the printing device.

SUMMARY

This application is directed to a method and system for establishing a unique and secure identity for a printing device at the time of manufacturing.

The printing device can be used, for example, to personalize plastic cards such as financial cards including credit and debit cards, identification cards, driver's licenses, and other personalized plastic cards. In some embodiments, the printing device is a card printer.

The embodiments described herein can generate a unique and secure identity for any type of printing device and subcomponents of the printing device. The types of printing devices and subcomponents of a printing device (hereinafter referred to simply as the printing device) can include, for example, a central card issuance system, a desktop card printer, a desktop embosser, a passport system, a desktop laminator, a smart card reader, an input and/or output card hopper, etc.

Each unique and secure identity can include one or more unique private keys, each of which is associated with a different operation (for example, authenticating a connection to a server or encrypting payload data) of the printing device. Each of the unique private keys can be stored in a secure memory portion of the printing device or be protected by a storage root key stored in a secure memory portion of the printing device. Authorization of a particular operation of the printing device can be established using a Public Key Infrastructure (PKI) with the particular private key that is associated with the particular operation to be performed by the printing device and the corresponding public key.

In some embodiments, the secure memory portion can store one or more public keys each of which is associated with a different operation (for example, authenticating supplies, performing a secure boot operation) of the printing device. Each of the unique public keys can be stored in a secure memory portion of the printing device or be protected by a storage root key stored in a secure memory portion of the printing device. Authorization of a particular operation of the printing device can be established using a Public Key Infrastructure (PKI) with the particular public key that is associated with the particular operation to be performed by the printing device and the corresponding private key.

The unique and secure identity can be generated at the time of manufacturing (e.g., at factory) to provide assurance to the user that the printing device is not configured with unauthorized firmware, hardware, and/or software. That is, the embodiments described herein can prevent the printing device from running if it is configured with unauthorized firmware, hardware and/or software. The embodiments described herein can also prevent network attacks that would allow an external device/software to monitor customer personalization data.

Establishing a unique printer identity at the time of manufacture provides each printing device with a verifiable identity and makes it harder to compromise the identity once the machine is placed into the field. It also creates a factory baseline for comparing authentic firmware to malware and/or other unwanted code that may be added in the field.

In some embodiments, a unique private key can be generated for each of the following operations: authentication of the printing device by a cloud server/service; authentication of supplies for use by the printing device; authentication of the printing device by a printer client (e.g., document design and/or issuance and/or management systems, etc.) using printer protocols; authenticate signed firmware for modification (e.g., firmware upgrade and/or firmware downgrade); authenticate a print manager; authenticate modular device security; authenticate configuration settings of the printing device; authenticate source of print jobs, configuration data, etc.; secure and/or measured boot of the printing device; Secure Sockets Layer/Transport Layer Security (SSL/TLS) authentication; authenticate modular device security (a multi-hopper, a touch screen, etc.); provide dual authentication; authenticate private key storage; authenticate file system encryption (e.g., whole files system encryption, customer data only encryption, etc.); payload encryption; etc.

In some embodiments, two or more of the unique private keys can be established during manufacturing of the printing device (e.g., "at factory").

Also, in some embodiments, one or more of the unique private keys can also be established/loaded after manufacturing outside of the factory (e.g., by the customer, or by a Remote Monitoring and Management (RMM) server component (hereinafter referred to as a "customer identity"). Accordingly, a customer can supplement the at factory or manufacturer identity with their own customer identity.

In one embodiment, a method for establishing a unique and secure identity of a printing device is provided. The method includes obtaining a first private key for use with a first operation (for example, TLS/SSL authentication) of the printing device. The method also includes obtaining a second private key for use with a second operation (for example, payload encryption) of the printing device. Also, the method includes loading the first private key into a secure memory portion of the printing device during manufacturing of the printing device. Further, the method includes loading the second private key into the secure memory portion of the printing device during manufacturing of the printing device.

In another embodiment, a printing device is provided. The printing device includes a printer functionality component, a network input/output, a processor and a secure memory portion. The printer functionality component performs a physical action on a customized personalization document such as a financial card or ID. The network input/output transmits and receives data outside the printing device. The processor controls operation of the printer functionality component. The secure memory portion stores a unique and secure identity of the printing device including at least one factory established key associated with a secure boot operation. In some embodiments, the unique and secure identity can include a plurality of factory established keys. Each of the plurality of factory established keys can be associated with a different operation of the printing device. In some embodiments, when the processor receives data that would require an operation to be performed by the printing device and a public key to authorize the operation, the processor can determine whether the operation is authorized based on the public key and a factory established private key associated with the operation before the processor processes the data and the printing device performs the operation. In some embodiments, when the processor receives data that would require an operation to be performed by the printing device and a private key to authorize the operation, the processor can determine whether the operation is authorized based on the private key and a factory established public key associated with the operation before the processor processes the data and the printing device performs the operation. In yet another embodiment, a method for performing an operation of a printing device is provided. The method includes a processor of the printing device receiving, from an external secondary device, data and an authorization request for validating authorization for the printing device to perform the operation. The method also includes retrieving a key corresponding to the operation amongst one or more keys stored in a secure memory portion of the printing device. Also, the method includes the processor determining whether the operation is authorized using the authorization request and the retrieved key. Further, the method includes the printing device performing the operation when the operation is authorized, and includes the printing device performing a physical action on a customized personalization document.

In yet another embodiment, a printing device is provided. The printing device includes a housing, a card input in the housing, a card travel path, a print engine and a secure memory portion. The card travel path extends through the housing from the card input. The print engine is disposed along the card travel path. The secure memory portion stores a unique and secure identity of the printing device including at least one factory established key associated with an operation performed by the printing device.

In yet another embodiment, a method of generating a unique and secure identity of a printing device during manufacturing of the printing device is provided. The method includes reading a unique printing device serial number associated with a component of the printing device. The method also includes sending the unique printing device serial number to a certificate authority. Also, the method includes receiving from the certification authority a certificate that is unique to the printing device containing the unique printing device serial number. Further, the method includes loading the certificate to the printing device. In some embodiments, the unique printing device serial number can be placed in the common name field of the certificate.

DRAWINGS

DETAILED DESCRIPTION

Figure 1:
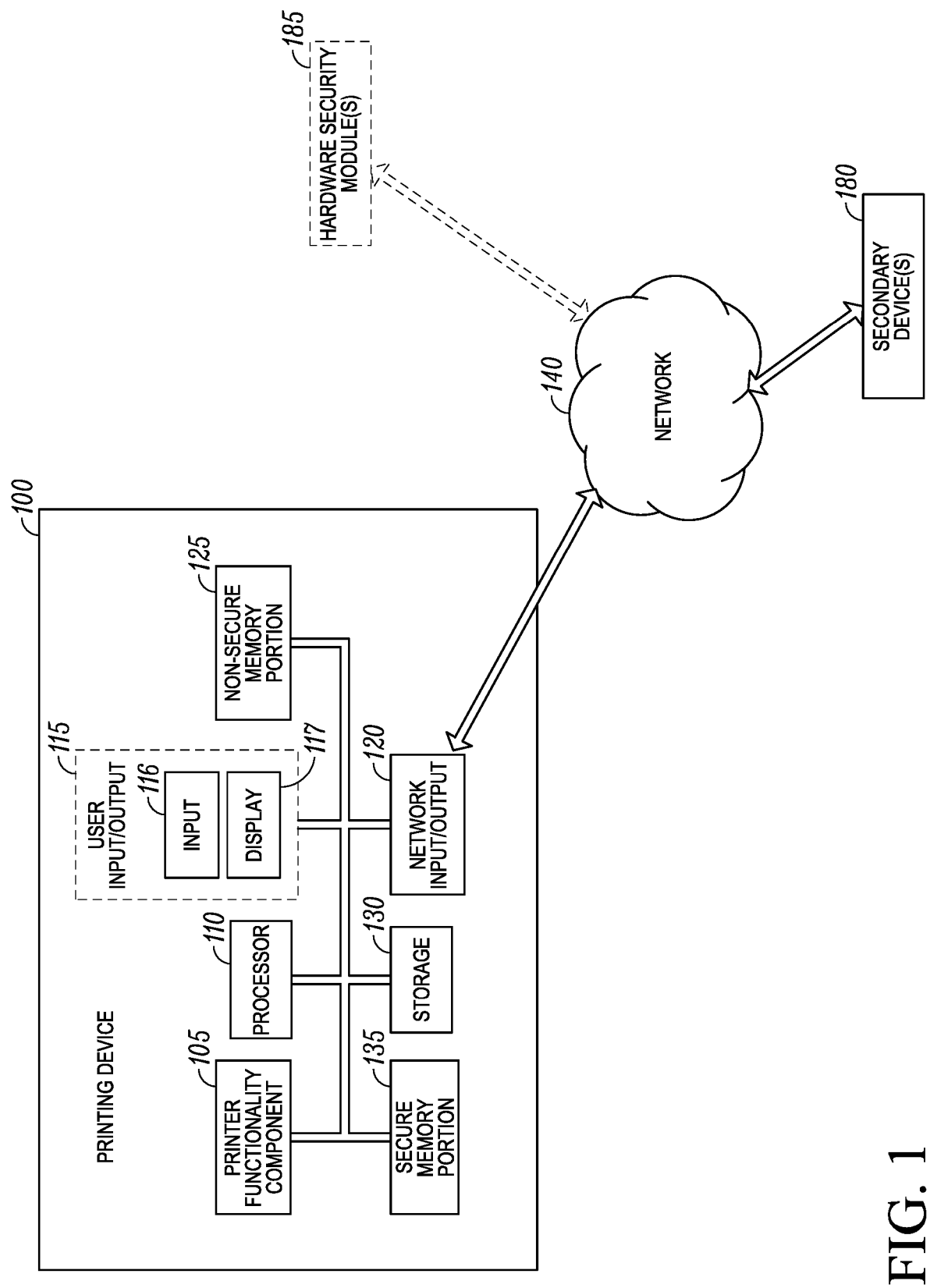
FIG. 1 illustrates a schematic diagram of an exemplary architecture for a printing device, according to one embodiment.

This application is directed to a method and system for establishing a unique and secure identity for a printing device at the time of manufacturing.

In particular, the embodiments described herein can generate a unique and secure identity for any type of printing device or subcomponent of a printing device. Each unique and secure identity can include one or more unique private keys, each of which is associated with a different operation of the printing device. Each of the unique private keys can be stored in a secure memory portion of the printing device. Authorization of a particular operation of the printing device can be established using PKI with the particular private key associated with the particular operation in conjunction with the corresponding public key.

As described in the embodiments disclosed herein, a printing device includes a secure memory portion that stores a unique and secure identity defined at the time of manufacture and that can be verified remotely. In some embodiments, the customer can supplement the unique and secure identity with their own custom printer identity that is installed by the customer and stored in the secure memory portion. The custom printer identity can be used, for example, for TLS server authentication. In some embodiments, portions of the custom printer identity can be usable alongside portions of the unique and secure printer identity (e.g., for TLS client authentication). In some embodiments, portions of the custom printer identity can override portions of the unique and secure printer identity. Also, in some embodiments portions of the unique and secure printer identity that are overridden by portions of a customer printer identity can remain stored in the secure memory portion.

In some embodiments, one or more private keys associated with a certificate can be stored in a secure memory portion of a printing device. This can include private keys corresponding to a unique and secure printer identity, a customer printer identity, and or a payload protection certificate. Data (e.g., public key(s), private key(s), certificate(s), storage root key(s), attestation identity key(s), etc.) stored in a secure memory portion of a printing device can include data entirely loaded/stored in the secure memory portion and data stored (including portions of data) stored outside of the secure memory portion that is protected by a storage root key that is stored in the secure memory portion.

The types of printing devices and subcomponents of a printing device (hereinafter referred to simply as the printing device) can include, for example, a central card issuance system, a desktop card printer, a desktop embosser, a passport system, a desktop laminator, a smart card reader, an input and/or output card hopper, etc.

A unique and secure identity of the printing device, as defined herein, refers to one or more private keys stored within a secure memory portion of the printing device. The unique and secure identity of the printing device can also include one or more certificates, one or more public keys, and/or one or more key pairs (e.g., a public key and a private key). The unique and secure identity is generated at the time of manufacture and can be verified remotely. In some embodiments, a customer may be able to supplement the unique and secure identity with their own custom printer identity.

A private key, as defined herein, refers to a cryptographic key intended to be known only to a recipient that can be used to, for example, decipher data encrypted with a public key associated with the private key.

A public key, as defined herein, refers to a cryptographic key that can be obtained and used by anyone to, for example, encrypt data intended for a particular recipient that can only be deciphered by using the associated private key.

A certificate, as defined herein, refers to a digital document containing attributes associated to the printing device that is issued by an attribute authority and is used to characterize and/or entitle the printing device and/or a secondary device to operate or work with the printing device. The certificate can bind an identity to a particular key associated with the certificate. The certificate can include, for example, an issuance date of the certificate before which a key can be invalid, an expiration date of the certificate after which the key can become invalid, policy information including restrictions on the key associated with the certificate, a serial number of the printing device, a serial number for one or more unique subcomponents of the printing device (e.g., a serial number of a Trusted Platform Module (TPM), a serial number of a Field Programmable Gate Array (FPGA), etc.), a private key, a public key, etc.

A Certificate Authority (CA), as defined herein, can store, generate, issue, and sign one or more certificates, private keys, and/or public keys. A manufacturer CA refers to a CA that provides one or more certificates, private keys, and/or public keys to a printing device at factory and/or during manufacturing of the printing device. A third party CA includes a CA that a customer can use to provide one or more certificates, private keys, and/or public keys to a printing device after manufacturing of the printing device.

A secure memory portion, as defined herein, refers to an isolated memory portion associated with the printing device that stores the unique and secure identity of the printing device therein. The secure memory portion can store, for example, a storage root key, an attestation identity key, one or more certificates, one or more private keys, and/or one or more public keys.

An attestation identity key, as defined herein, refers to an identity key that can be used to find and bind other identity keys stored in a secure memory portion to an endorsement key in order to complete a chain of trust between, for example, an endorsement key and each of a plurality of keys (including private keys) stored in the secure memory portion and associated with an identity (e.g., the unique and secure identity, one or more customer identities, etc.). The attestation identity key can attest to the fact that a particular key exists in the secure memory portion and can attest to measurements submitted to the secure memory portion to allow the secure memory portion to sign off on the measurements for later verification (e.g., during a measured boot discussed below).

A storage root key, as defined herein, refers to a key used to protect data and/or other keys stored outside of a secure memory portion.

The term "cryptographic hash", as defined herein, refers to a mathematical algorithm that maps data of arbitrary size to a bit string of a fixed size that is designed to be a one-way function (i.e., a function that is infeasible to invert).

A hardware security module (HSM), as defined herein, refers to a physical computing device that safeguards and manages digital keys for storing authentication and providing crypto-processing.

A factory established key, as defined herein, refers to a key (e.g., public, private, etc.) that is stored in the secure memory portion at a time during manufacturing of the printing device. The factory established key may be obtained and/or generated within the factory or outside of the factory.

FIG. 1 illustrates a schematic diagram of an exemplary architecture for a printing device 100 that can be used in the embodiments described herein. The printing device 100 generally includes one or more printer functionality component(s) 105, a processor 110, an optional user input/output (I/O) 115, a network I/O 120, a non-secure memory portion 125, a storage 130, a secure memory portion 135, and an interconnect 150. The printing device 100 can be in communication with one or more secondary devices 180 through a network 140. Optionally, the printing device 100 can also be in communication with one or more hardware security module(s) (HSM(s)) 185.

The printing device 100 is generally representative of hardware aspects of a variety of printing devices and subcomponents that can be used in the issuance of a customized personalization document. Examples of the printing device 100 can include a distributed issuance printer, a central card issuance system, a desktop card printer, a desktop embosser, a passport system, a desktop laminator, a smart card reader, an input and/or output card hopper, etc. It will be appreciated that the examples of the printing device 100 listed above are exemplary and other types of printing devices can also be included.

The printer functionality component 105 can perform one or more primary functions of the printing device 100. For example, when the printing device 100 is a desktop card printer, the printer functionality component 105 can print a card. In another example, when the printing device 100 is a desktop embosser, the printer functionality component 105 can emboss a card. In yet another example, when the printing device 100 is a desktop laminator, the printer functionality component 105 can laminate a card. Printer functionality component 105 can include a magnetic stripe station that can read and/or write data to a magnetic stripe. Printer functionality component 105 can also include a chip programming station that can read data on a chip and/or write data to a chip.

The processor 110 controls operation of the printing device 100 including the printer functionality component 105, the network I/O 120 and the optional user I/O 115. The processor 110 can retrieve and execute programming data obtained by the network I/O 120 and/or the optional user I/O 115 and stored in the non-secure memory portion 125, the secure memory portion 135 and/or the storage 130. The processor 110 can also store, identify and use application data residing in the non-secure memory portion 125.

The interconnect 150 is used to transmit programming instructions and/or application data between the processor 110, the printer functionality component 105, the optional user I/O 115, the network I/O 120, the non-secure memory portion 125, the storage 130, and the secure memory portion 135. The interconnect 150 can, for example, be one or more busses or the like. The processor 110 can be a single processor, multiple processors, or a single processor having multiple processing cores.

The optional user I/O 115 can include a display 116 and/or an input 117, according to some embodiments. It is to be appreciated that the optional user I/O 115 can be one or more devices connected in communication with the printing device 100 that is physically separate from the printing device 100. For example, the display 116 and the input 117 can be connected in communication but be physically separate from the printing device 100. In some embodiments, the display 116 and input 117 can be physically included with the printing device 100.

The display 116 can include any of a variety of display devices suitable for displaying information to the user. Examples of devices suitable for the display 116 include, but are not limited to, a cathode ray tube (CRT) monitor, a liquid crystal display (LCD) monitor, a light emitting diode (LED) monitor, or the like.

The input 117 can include any of a variety of input devices or means suitable for receiving an input from the user. Examples of devices suitable for the input 117 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 117 can be included as the input 117. In some embodiments, the input 117 can be integrated with the display 116 such that both input and output are performed by the display 116.

The network I/O 120 is configured to transmit and receive data to one or more secondary device(s) 180 and optionally one or more hardware security module(s) (HSM(s)) 185 via the network 140. The network 140 may alternatively be referred to as the communications network 140. Examples of the network 140 can include, but are not limited to, a local area network (LAN), a wide area network (WAN), the Internet, a wired communication link, or the like. In some embodiments, the network I/O 120 can transmit and receive data via the network 140 through a wireless connection using WiFi, Bluetooth, ZigBee or other similar wireless communication protocols. In some embodiments, the printing device 100 can transmit data via the network 140 through a cellular, 3G, 4G, or other wireless protocol. In some embodiments, the network I/O 120 can transmit and receive data via a wire line, an optical fiber cable, a Universal Serial Bus "USB" cable, or the like. It is to be appreciated that the network I/O 120 can communicate through the network 140 through suitable combinations of the preceding wired and wireless communication methods.

The non-secure memory portion 125 is generally included to be representative of a random access memory such as, but not limited to, Static Random Access Memory (SRAM), Dynamic Random Access Memory (DRAM), or Flash. In some embodiments, the non-secure memory portion 125 can be a volatile memory. In some embodiments, the non-secure memory portion 125 can be a non-volatile memory. In some embodiments, at least a portion of the memory can be virtual memory.

The storage 130 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 130 is a computer readable medium. In some embodiments, the storage 130 can include storage that is external to the printing device 100, such as in a cloud.

The secure memory portion 135 is generally included to be representative of a memory storage device that is distinct and/or separate from the non-secure memory portion 125 and the storage 130. In some embodiments, the secure memory portion 135 includes a processor. The secure memory portion 135 can include for example, a secure crypto processor such as a TPM, a JAVA card, a memory device, etc. Suitable TPMs are sold by Infineon Technologies AG (Munich, Germany). In some embodiments, the secure memory portion 135 includes the capabilities for the secure generation of cryptographic keys. In some embodiments, private keys used in the secure memory portion 135 are not accessible on a bus or to external programs and all encryption/decryption is done within the secure memory portion 135. In some embodiments, the secure memory portion 135 can be part of the same memory device as the non-secure memory portion 125 and/or the storage 130, but isolated from the non-secure memory portion 125 and/or the storage 130.

The secure memory portion 135 is configured to store the unique and secure identity of the printing device 100 generated at the factory and/or during manufacturing of the printing device 100. In particular, the secure memory portion 135 can store a plurality of private keys that help form the unique and secure identity of the printing device 100. Each of the private keys can be associated with a different operation of the printing device 100. In some embodiments, the printing device 100 can be issued one or more certificates by a Central Authority (CA) such as, for example, a manufacturing CA with any corresponding private keys stored in the secure memory portion 135.

In some embodiments, at the time of manufacturing the printing device 100, a CA can generate four key pairs (e.g., a storage root key pair, an attestation key pair, printer identity key pair, and a payload protection key pair) and three certificates (e.g., an attestation certificate, a printer identity certificate, and a payload protection certificate). The printer identity certificate and/or the payload protection certificate may contain a serial number unique to a component of the printer.

The secure memory portion 135 can also store one or more custom printer identities provided by a customer after manufacturing of the printing device 100. Each custom printer identity can include one or more custom private keys that can supplement and/or override one or more private keys of the unique and secure identity.

In some embodiments, storing a plurality of private keys in the secure memory portion refers to using a storage root key stored in the secure memory portion 135 to protect the private keys, for example by encryption, that are then stored outside of the secure memory portion 135. Private keys protected by the storage root key can be decrypted by passing them back through the secure memory portion 135. Accordingly, the secure memory portion 135 is not required to store each of the private keys in their entirety and thus storage space within the secure memory portion 135 can be reduced.

Authorization of a particular operation of the printing device 100 can be established using the particular private key associated with the particular operation.

To illustrate, in one example, the secure memory portion 135 can include a public key to authenticate supplies (e.g., printer ribbon, printer ink, etc.) to be used by the printer functionality component 105. When a supply is added to the printing device 100, the processor 110 can check to see that the supply has an authorization request (e.g., a private key certificate, a public key certificate, etc.). If the supply has an authorization request, the processor 110 can use the particular public key associated with adding supplies to the printing device 100 and use the public key in conjunction with the authorization request to ensure that the supply is authorized by the printing device 100. If the supply does not include an authorization request or if the authorization request is not authorized by the public key, the processor 110 can instruct the printer functionality component 105 not to operate until the supply is replaced and/or providing a notification/alarm to the user.

In some embodiments, a unique private key can be generated for authentication of the printing device 100 by a cloud server/service via the network I/O 120, for example during initial registration or enrollment of the printing device 100 to the cloud server/service.

In some embodiments, a unique private key can be generated for authentication of supplies (e.g., printer ribbon, printer ink, etc.) for use by, for example, the printer functionality component 105 of the printing device 100.

In some embodiments, a unique private key can be generated for authentication of the printing device 100 by a printer client (e.g., document design and/or issuance and/or management systems, etc.) using printer protocols.

In some embodiments, a unique private key can be generated for authentication of the printing device by a print manager.

In some embodiments, a unique private key can be generated to authenticate a firmware upgrade and/or downgrade. This can include authentication for, for example, major and minor releases and patches.

In some embodiments, a unique private key can be generated to authenticate modular device security. This can include authentication for, for example, a multi-hopper, a touch screen, etc.

In some embodiments, a unique private key can be generated to authenticate configuration settings of the printing device 100. This can include authentication for, for example, printer speed settings, printer color parameter settings, etc.

In some embodiments, a unique private key can be generated to authenticate a source of print job(s), configuration data, etc. This can include authentication for, for example, each client sending a print job to the printing device 100.

In some embodiments, a unique private key can be generated to facilitate a secure boot of the printing device 100. This can include authentication, for example, every time the printing device 100 is turned on. Accordingly, the printing device 100 can be prevented from running when configured, for example, with unauthorized software. The customer can therefore be confident that the printing device 100 is running a safe and secure software (e.g., the manufacture provided software).

For example, in a secure boot, each step of the booting process verifies authentication of the secure boot prior to moving onto the next step of the booting process.

In some embodiments, a cryptographic hash of a public key is programmed into the processor 110 and an internal boot loader (e.g., a boot read-only memory (ROM)) of the processor 110 can refuse to transfer control to an external boot loader unless it is signed with a private key matching the cryptographic hash of the public key.

In some embodiments, the cryptographic hash of a public key (e.g., a secure boot public key) can be burned into a portion of the processor 110. That is, the cryptographic hash of the public key can be programmed into a fuse block of the processor 110 so that the cryptographic hash of the public key can be read but not reprogrammed. Accordingly, the amount of storage space in the processor required can be reduced as the cryptographic hash of the public key takes up less storage space than the public key. For example, in one embodiment, the secure boot public key can have a storage space size of more than 2000 bits and the cryptographic hash of the secure boot key can have a storage space size of about 160 bits up to about 256 bits. In some embodiments, the portion of the processor 110 can be a P1010 security fuse processor available from Freescale Semiconductor, Inc., which was acquired by NXP (Eindhoven, Netherlands).

In some embodiments, a private key (e.g., a security boot private key) can be stored offline and external of the printing device 100 (e.g., at a CA).

In some embodiments, a unique private key can be generated to authenticate a measured boot of the printing device 100. In a measured boot, authentication is not necessarily verified at each step of the booting process before allowing the booting process to proceed to the next step. Rather, in a measured boot, each step of the booting process is measured and stored (in some embodiments as a cryptographic hash) in the secure memory portion 135 for later attestation. The measured boot may continue to proceed through each step of the booting process even if proper authentication has not been verified at one or more of the previous steps of the booting process.

In one embodiment of a measured boot, at each step of the booting process the external boot loader can initialize the secure memory portion 135, measure a current state of the boot process (e.g., firmware image) of the external boot loader and a current state of the boot process (e.g., firmware image) of an operating system of the printing device 100, and send the results to the secure memory portion 135 for secure attestation. The attestation identity key can be used by the secure memory portion 135 to attest to the results sent to the secure memory portion 135 for later verification.

In some embodiments, the external boot loader can be configured to store one or more of: a public key for verification of a firmware signing key, a list of additional trusted firmware signing key pairs, and a blacklist of unsecure firmware images.

In some embodiments, a unique private key can be generated for SSL/TLS authentication between the printing device 100 and one or more secondary devices 180 such as, for example, a server. Also, in some embodiments, a unique private key for SSL/TLS authentication generated during manufacturing of the printing device can be replaced with a customer initiated unique private key for SSL/TLS authentication. In other embodiments, the unique private key for SSL/TLS authentication generated during manufacturing of the printing device can be used alongside with a customer initiated unique private key for SSL/TLS authentication. In these embodiments, a TLS server can indicate which private key it wants by specifying the Root of Trust supported as part of the TLS handshake between the TLS server and the printing device 100.

In some embodiments, when a client (e.g., a print driver, a management tool, etc.) connects to the printing device 100, the connection can be performed over/using TLS and the printing device 100 can use a printer identity certificate to determine whether the client is authorized to connect to the printing device 100.

In some embodiments, a manufacturer printer identity certificate issued by a manufacturer CA during manufacturing of the printing device 100 can be for TLS server authentication, TLS client authentication, and other purposes of the printing device 100. In these embodiments, the manufacturer printer identity certificate includes a TLS private key(s) that can be stored in the secure memory portion 135, while the TLS authentication public key(s) can be certified by a CA. A customer may additionally configure a separate custom printer identity certificate that can be, for example, self-signed by the printing device 100, or generated by a third party CA. The printing device 100 can be configured to use the custom printer identity certificate instead of the manufacturer printer identity certificate. In some embodiments, even if the custom printer identity certificate is used instead of the manufacturer printer identity certificate, the manufacturer printer identity certificate may remain saved in the secure memory portion 135.

In some embodiments, a unique private key can be generated to provide dual authentication communication via the network I/O 120. This can include authentication, for example, to allow user(s) to log into the printing device 100 and/or access the printing device 100.

In some embodiments, a unique private key can be generated to authenticate key and certificate storage. This can include authentication for, for example, field overwrites of one or more private keys (e.g., authenticate a customer initiated private key).

In some embodiments, a unique private key can be generated to authenticate file system encryption (e.g., whole files system encryption, customer data only encryption, etc.). This can include authentication for providing file system encryption for, for example, log files, job history, etc.

In some embodiments, a unique private key can be generated to facilitate payload encryption. Payload encryption can allow data to be encrypted prior to being transmitted over, for example, a TLS connection. In some embodiments, separate certificates with separately configured roots of trust can be used for data sent to the printing device 100 and data transmitted by the printing device 100.

In some embodiments, the printing device 100 can be issued a payload protection certificate that can be used by, for example, one or more backend systems to encrypt data that is to be sent to the printing device 100. In some embodiments, the payload protection certificate may also be used by the printing device 100 to sign data originating from the printing device 100. A payload protection private key can be stored in the secure memory portion 135 and a payload protection public key can be certified by a manufacturer CA during manufacturing of the printing device 100. A customer may additionally configure a separate custom payload protection certificate that can be, for example, self-signed by the printing device 100, or generated by a third party CA. The printing device 100 can be configured to use the custom payload protection certificate instead of a manufacturer printer identity certificate. In some embodiments, even if the custom payload protection certificate is used instead of the manufacturer payload protection certificate, the manufacturer payload protection certificate may remain saved in the secure memory portion 135.

In some embodiments, two or more of the unique private keys can be established while the printing device 100 is still being manufactured (also known as an "at factory identity").

Also, in some embodiments, one or more of the unique private keys can also be established after manufacturing of the printing device and/or outside of the factory (e.g., by the customer, a legacy printing device (e.g., a printing device without a secure memory portion)), or by a RMM server component (also known as a "customer identity"). A private key established outside of the factory is referred to herein as a customer initiated private key. In some embodiments, the two or more unique private keys of the at factory identity can be part of one Root of Trust while the one or more customer initiated private keys can be part of one or more different Root of Trusts. Accordingly, a customer can supplement the at factory identity with their own customer identity, that is installed into the printing device 100. For example, encrypting and/or decrypting operations of the printing device 100 can use a customer initiated private key to protect customer specific data being encrypted or decrypted (e.g., name information, credit card number information, date of birth information, etc.). In some instances, a customer initiated private key cannot replace and/or override a factory established private key in order to protect specific operations (e.g., maintenance operations) performed by the printing device 100. For example, a customer initiated private key may not be used, for example, for a firmware upgrade and/or downgrade operation, for a maintenance task of the printing device 100, for creating and/or replacing the at factory identity, etc.

In some embodiments, the printing device 100 can communicate with one or more optional HSM(s) 185. Each of the optional HSM(s) 185 can include for example, a secure crypto processor such as a TPM, a JAVA card, a memory device, etc. Each of the HSM(s) 185 can be configured to store one or more certificates, one or more public keys, one or more private keys, an attestation identity key, and/or a storage root key associated with the printing device 100. In some embodiments, one or more of the HSM(s) 185 can work in conjunction with and/or in lieu of the secure memory portion 135.

Figure 2:
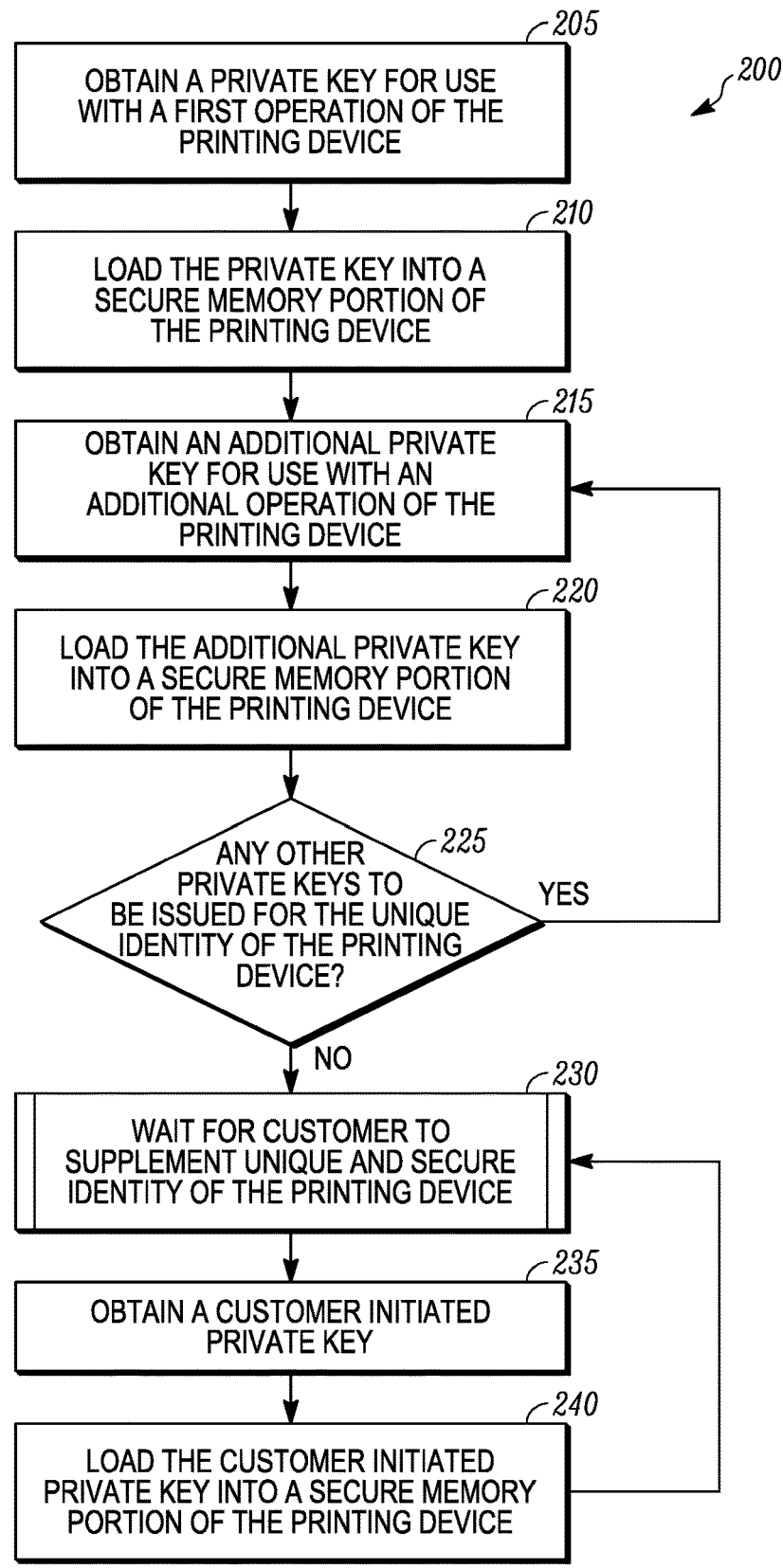
FIG. 2 illustrates a flowchart of a method for providing identity and security to a printing device, according to one embodiment.

FIG. 2 illustrates a flowchart of one embodiment of a method 200 for providing identity and security to the printing device 100 shown in FIG. 1. At 205, while at a factory, the processor 110 of the printing device 100 obtains a private key for use with a first operation of the printing device 100. The first operation can be any of the operations discussed above with respect to FIG. 1. For example, in one embodiment, the first operation can be TLS/SSL authentication. In some embodiments, the private key can be issued to the printing device 100 by an attribute authority. At 210, during manufacturing of the printing device 100, the processor 110 loads the private key into the secure memory portion 135.

At 215, during manufacturing of the printing device 100, the processor 110 of the printing device 100 obtains an additional private key for use with an additional operation of the printing device 100. Similar to the first operation, the additional operation can be any of the operations discussed above with respect to FIG. 1. For example, in one embodiment, the second operation can be payload encryption. In some embodiments, the additional private key can also be issued to the printing device 100 by the attribute authority. At 220, during manufacturing of the printing device 100, the processor 110 loads the additional private key into the secure memory portion 135. At 225, the processor 110 determines whether any other private keys are to be issued to establish the unique and secure identity of the printing device 100 during manufacturing of the printing device 100. If another private key is to be issued during manufacturing, the method 200 proceeds back to 215. If no other private keys are to be issued during manufacturing, the method 200 proceeds to 230.

At 230, after the printing device 100 is manufactured and/or is outside of the factory, the processor 110 waits for a customer to supplement the unique and secure identity of the printing device 100. At 235, the processor 110 obtains a customer initiated private key for use with an operation of the printing device 100. The operation can be any of the operations discussed above with respect to FIG. 1. In some embodiments, the customer initiated private key is issued to the printing device 100 by an attribute authority.

In some embodiments, the attribute authority can be the same attribute authority that issued the first private key and the additional private key(s). In other embodiments, the attribute authority can be a different attribute authority. Also, in some embodiments, the customer initiated private key can be part of a different Root of Trust than the Root of Trust for the first private key and the additional private key(s). Customer initiated private key(s) that are part of a different Root of Trust than the private keys loaded into the secure memory portion 135 at during manufacturing allows a customer to protect and control customer specific data.

At 240, the processor 110 loads the customer initiated private key into the secure memory portion 135. In some embodiments when the customer initiated private key is for an operation that the secure memory portion 135 has already stored a private key, the processor 110 replaces the previously stored private key with the customer initiated private key. In other embodiments, the processor 110 stores both the previously stored private key with the customer initiated private key in the secure memory portion 135. The process 200 then returns to 230.

Figure 3:
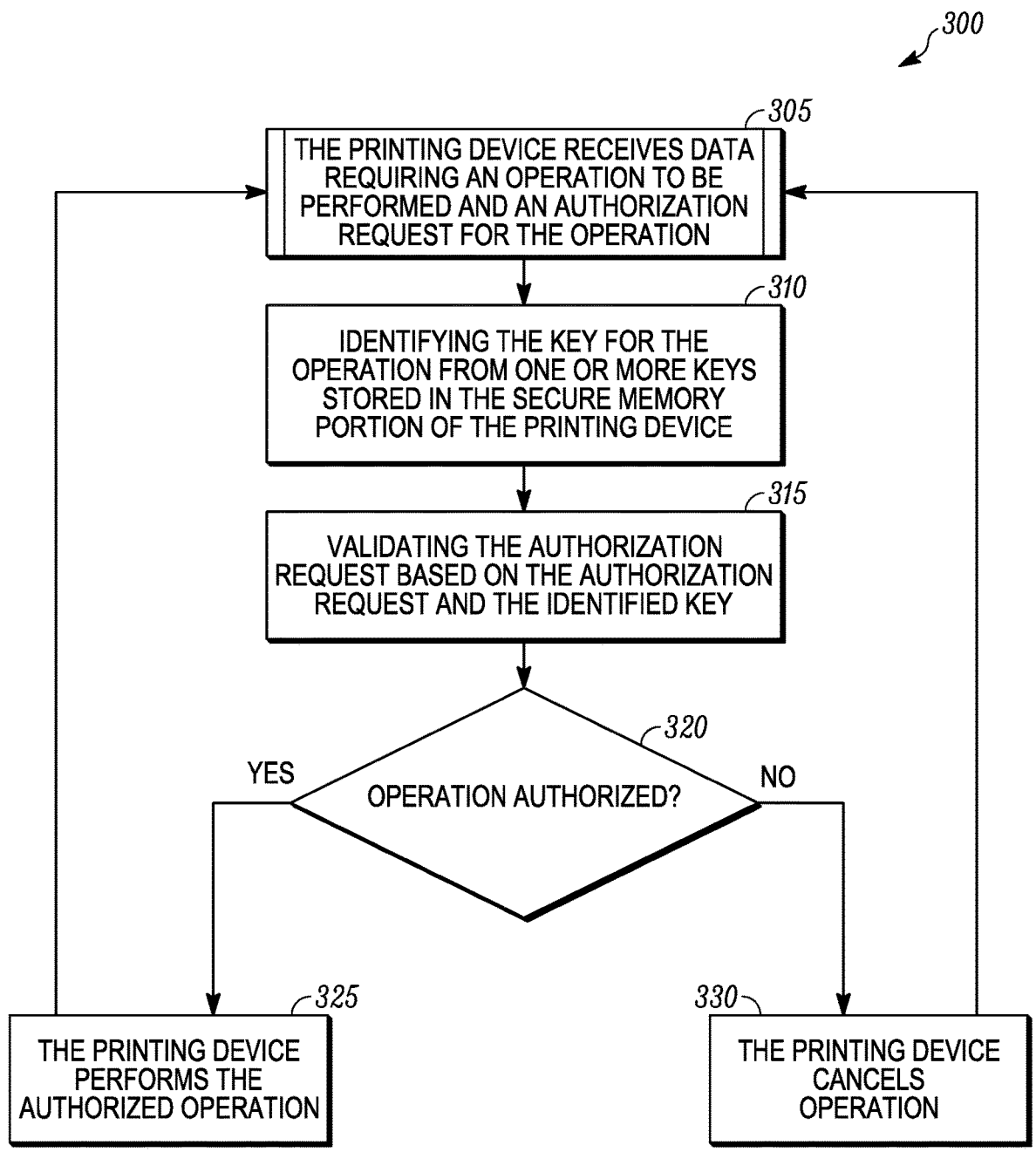
FIG. 3 illustrates a flowchart of a method for performing an operation of a printing device, according to one embodiment.

FIG. 3 illustrates a flowchart of one embodiment of a method 300 for performing an operation of the printing device 100 shown in FIG. 1. The operation can be any of the operations discussed above with respect to FIG. 1. At 305, the printing device waits to receive data that requires the printing device 100 to perform an operation and an authorization request (e.g., a public key certificate, a private key certificate, etc.) for the operation. The data and authorization request may be received via the network I/O 120 and/or the optional user I/O 115. Once data requiring the printing device 100 to perform an operation and an authorization request is received, the method 300 then proceeds to 310.

At 310, a key (e.g., a private key, a public key, etc.) associated with the operation to be performed is identified from one or more keys stored in the secure memory portion 135. In some embodiments, the processor 110 can identify the key to be used. In other embodiments, a processor within the secure memory portion 135 can identify the key to be used. It will be appreciated that in other embodiments, any other processor external or internal to the printing device 100 could also identify the key to be used. The method 300 then proceeds to 315.

At 315 the authorization request is validated using the authorization request and the identified key to determine whether the operation is authorized. In some embodiments, the processor 110 can validate the authorization request. In other embodiments, a processor within the secure memory portion 135 can validate the authorization request. It will be appreciated that in other embodiments, any other processor external or internal to the printing device 100 can also validate the authorization request. If it is determined that the operation is authorized based on the authorization request and the identified key at 320, the method 300 proceeds to 325. Otherwise, the method 300 proceeds to 330.

At 325, the printing device 100 performs the operation and the method 300 returns to 305. At 330, the processor 110 cancels the operation and can optionally provide a notification/alarm to the user. The method 300 then returns to 305.

Figure 4:
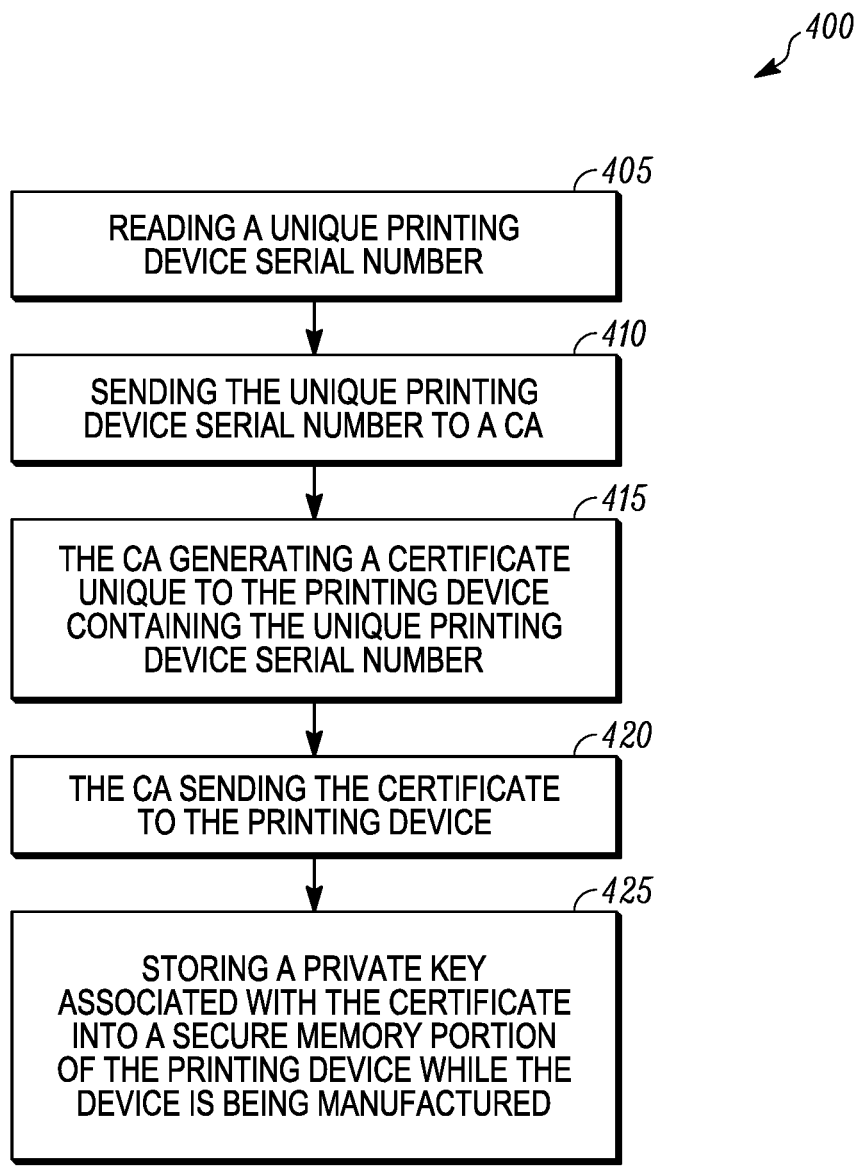
FIG. 4 illustrates a flowchart of a method for generating a unique and secure identity of a printing device during manufacturing of the printing device, according to one embodiment.

FIG. 4 illustrates a flowchart of a method 400 for generating a unique and secure identity of a printing device during manufacturing of the printing device. The method begins at 405 whereby a unique printing device serial number from the printing device being manufactured is read. The unique printing device serial number can include, for example, the serial number for the entire printing device, the serial number for one or more subcomponents of the printing device (e.g., the serial number of a TPM, the serial number of a FPGA, etc.), etc. In some embodiments, a client reads the unique printing device serial number from the printing device being manufactured.

At 410, the unique printing device serial number is sent to a CA. In some embodiments, a client sends the unique printing device serial number to the CA.

At 415, the CA generates a certificate unique to the printing device that is based on and includes the unique printing device serial number. The private key can be associated with any one of a plurality of different operations of the printing device. By using the unique printing device serial number to generate the certificate, an identity is generated for the printing device being manufactured that is both unique and secure.

In some embodiments, a certificate can be generated for each of the following operations: authentication of the printing device by a cloud server/service; authentication of supplies for use by the printing device; authentication of the printing device by a printer client (e.g., document design and/or issuance and/or management systems, etc.) using printer protocols; authenticate signed firmware for upgrade and/or downgrade; authenticate a print manager; authenticate modular device security; authenticate configuration settings of the printing device; authenticate source of print jobs, configuration data, etc.; authenticate secure and/or measured boot of the printing device; Secure Sockets Layer/Transport Layer Security (SSL/TLS) authentication; authenticate modular device security (a multi-hopper, a touch screen, etc.); provide dual authentication; authenticate key and certificate storage; authenticate file system encryption (e.g., whole files system encryption, customer data only encryption, etc.); authenticate payload encryption; etc.

At 420, the CA sends the certificate to the printing device. In some embodiments, the CA can send the certificate to the printing device directly. In other embodiments, the CA can send the certificate to the client and the client then forwards the certificate over to the printing device.

At 425, the printing device stores a private key associated with the certificate into a secure memory portion of the printing device while the printing device is being manufactured. This provides assurance to the user that the printing device is not configured with unauthorized firmware, hardware, and/or software. Also, this can prevent the printing device from running if it is configured with unauthorized firmware, hardware and/or software. This can also prevent network attacks that would allow an external device/software to monitor customer personalization data.

Figure 5:
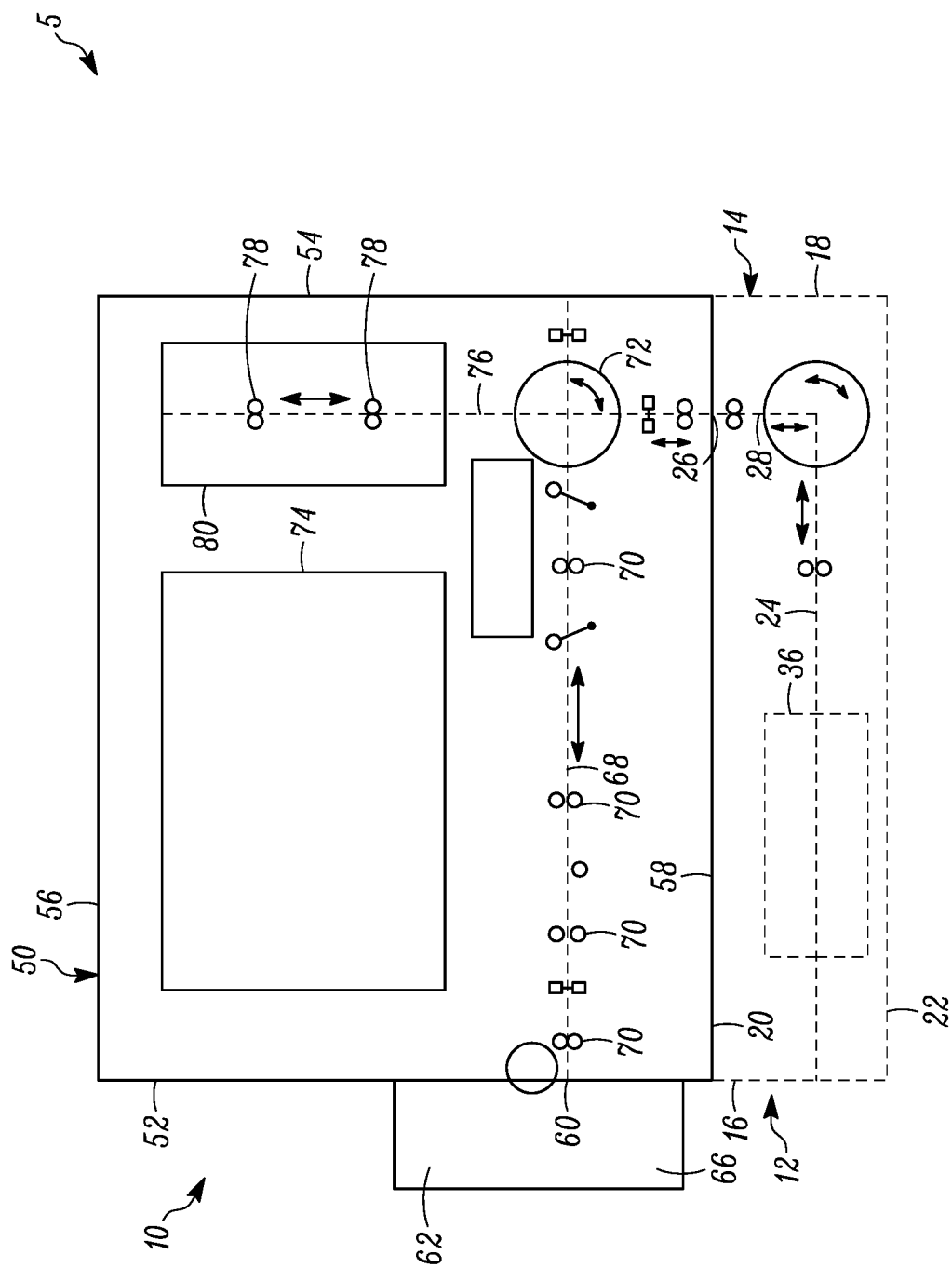
FIG. 5 illustrates one embodiment of a card printer that can be used with the embodiments described herein.

FIG. 5 illustrates one embodiment of a card printer 5 that can be used with the embodiments described herein. The card printer includes a modular print engine 10 that is detachably and removably mounted on top of a lower module 12. The card printer 5 is configured to personalize, for example, plastic cards such as financial cards including credit and debit cards, identification cards, driver's licenses, and other personalized plastic cards.

The modular print engine 10 includes a housing 50 having a front end 52, a rear end 54, a top 56 and a bottom 58. A main card input 60 is located at the front end 52 of the housing 50 through which plastic cards to be processed by the modular print engine 10 and/or by the lower module 12 (i.e. processed by the card printer 5) are input. In some embodiments, the card input 60 can also form a card output through which processed cards can be output from the modular print engine 10. In other embodiments, a card output that is separate from the card input 60, but also located at the front end 52 like the card input 60, can be provided through which processed cards can be output from the modular print engine 10. A card input hopper 62 can be mounted at the front end 52 of the housing 50 that is in communication with the card input 60. In embodiments where a card output is also located at the front end 52, a card output hopper 66 can also be mounted at the front end 52 of the housing 50 that is in communication with the card output for receiving finished processed cards.

A main or first card travel path 68 extends through the housing 50 from the input 60. In the illustrated example, the card travel path 68 extends substantially horizontally through the housing 50 substantially parallel to the bottom 58. Cards are transported along the card travel path 68 by a card transport mechanism, such as sets of rollers 70. A print engine 74 is disposed along the card travel path 68 that is configured to print on a card disposed on the card travel path 68. The print engine 74 can be configured to perform retransfer printing, direct to card printing, ink jet printing, laser marking, laser engraving, and any other type of printing performed on cards.

With continued reference to FIG. 5, a second card travel path 76 can extend upwardly from a card reorienting mechanism 72. In one embodiment, the second card travel path 76 extends substantially vertically upward from the card reorienting mechanism 72. Cards are transported along the card travel path 76 by a card transport mechanism, such as sets of rollers 78.

A removable option module 80 is disposed along the second card travel path 76 and above the first card travel path 68. The removable option module 80 includes at least one card processing mechanism that is configured to perform a processing operation on a plastic card. The removable option module 80 is one of a plurality of removable option modules 80 that can be installed one at a time in the modular print engine 10 to permit changes to the functionality of the modular print engine 10. Each option module 80 is configured to be individually and separately removably installed in the housing 50 along the second card travel path 76 and above the first card travel path 68, and each option module 80 is configured to perform a different processing operation on a plastic card received thereby. One option module 80 can be removed and replaced with a different option module 80 to change the functionality of the modular print engine 10. In one embodiment, the option module 80 can be a magnetic stripe station that can read data on a magnetic stripe of a card and/or write data onto the magnetic stripe. In another embodiment, the option module 80 can be a chip programming station that can read data on a chip of a card and/or write data to the chip.

The lower module 12 generally includes a lower module housing 14 illustrated in dashed lines with a front end 16, a rear end 18 opposite the front end 16, a top 20, and a bottom 22 opposite the top 20. A main card transport path 24 is defined in the housing 14 along which a plastic card is transported generally in a horizontal direction or generally parallel to the top 20 and the bottom 22. A slot 26 is defined in the top 20 of the housing 14 through which a card can be input into the housing 14 from the modular print engine 10 and, in some embodiments, output from the housing 14 back into the modular print engine 10. A secondary card transport path 28 leads from the slot 26 to a card reorienting mechanism 30 that is disposed adjacent to the rear end 18 of the housing 14. In one embodiment, the secondary card transport path 28 can be generally vertical or perpendicular to the main card transport path 24 which can be generally horizontal.

In operation of the lower module 12, a card enters the lower module 12 from the modular print engine 10 through the slot 26. The card is transported along the secondary card transport path 28 and into the card reorienting mechanism 30 which is then rotated to bring the card in line with the main card transport path 24. The card is then directed along the main card transport path 24 to one or more card processing mechanism(s) 36 which perform the one or more processing operations on the card. Examples of card processing mechanisms 36 that can be used include, but are not limited to, a card embosser or a card laminator. The lower module 12 can also include an output 38 at the end of the transport path 24 through which a card can be output from the lower module 12 after processing by the processing mechanism(s) 36. In some embodiments, the lower module 12 may also include a card de-bowing mechanism (not shown) that is used to eliminate a bow that may occur on the card as a result of processing by the processing mechanism(s) 36.

Further details of a card printer are described in U. S. 2016/0300128 which is incorporated by reference in its entirety. An example of retransfer printing is described in U.S. Pat. No. 6,894,710 the entire contents of which are incorporated herein by reference. Examples of suitable card reorienting mechanisms are described in U.S. 2013/0220984 and U.S. Pat. No. 7,398,972 each of which is incorporated herein by reference in its entirety. An example of a suitable de-bowing mechanism that can be used is described in US 2014/0345787 the entire contents of which are incorporated herein by reference.

Aspects described herein can be embodied as a system, method, or computer readable medium. In some embodiments, the aspects described can be implemented in hardware, software (including firmware or the like), or combinations thereof. Some aspects can be implemented in a computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided through a cloud-computing infrastructure. Cloud computing generally includes the provision of scalable computing resources as a service over a network (e.g., the Internet or the like).

Although a number of methods and systems are described herein, it is contemplated that a single system or method can include more than one of the above discussed subject matter. Accordingly, multiple of the above systems and methods can be used together in a single system or method.

Aspects:

It is to be appreciated that any of aspects 1-5, 6-11, 12-19, 20-22 and 23-25 can be combined.

Aspect 1. A printing device comprising:
a housing;
a card input in the housing;
a card travel path that extends through the housing from the card input;
a print engine disposed along the card travel path; and
a secure memory portion that stores a unique and secure identity of the printing device including at least one factory established key associated with an operation performed by the printing device.

Aspect 2. The printing device of aspect 1, wherein the at least one factory established key is a private key.

Aspect 3. The printing device of either one of aspects 1 or 2, further comprising at least one of:
a magnetic stripe station that reads and/or writes data on a magnetic stripe of a card; and
a chip programming station that reads and/or writes data on a chip of a card.

Aspect 4. The printing device of any one of aspects 1-3, wherein the at least one factory established key is a storage root key used to protect data stored outside of the secure memory portion.

Aspect 5. The printing device of any one of aspects 1-4, wherein the print engine is configured to perform at least one of retransfer printing, direct to card printing, ink jet printing, laser marking, and laser engraving on a card.

Aspect 6. A printing device comprising:
a printer functionality component that performs a physical action on a customized personalization document;
a network input/output that transmits and receives data outside the printing device;
a processor that controls operation of the printer functionality component; and
a secure memory portion that stores a unique and secure identity of the printing device including at least one factory established key associated with a secure boot operation.

Aspect 7. The printing device of aspect 6, further comprising a second printer functionality component that performs a second physical action on the customized personalization document, wherein the second physical action is different than the first physical action.

Aspect 8. The printing device of either one of aspect 6 or 7, wherein the at least one factory established key is a public key associated with the secure boot operation.

Aspect 9. The printing device of any one of aspects 6-8, wherein the customized personalization document is a financial or identification card and the printer functionality component includes a print engine adapted to print custom specific information onto the financial or identification card.

Aspect 10. The printing device of any one of aspects 6-9, wherein the secure memory portion stores a public key associated with at least one of a firmware modification operation and a supplies authentication operation.

Aspect 11. The printing device of any one of aspects 6-10, wherein the processor includes a public key burned into a memory portion of the processor.

Aspect 12. A method for establishing a unique and secure identity of a printing device, the method comprising:
obtaining a first private key for use with a first operation of the printing device;
obtaining a second private key for use with a second operation of the printing device;
loading the first private key into a secure memory portion of the printing device during manufacturing of the printing device; and
loading the second private key into the secure memory portion of the printing device during manufacturing of the printing device.

Aspect 13. The method of aspect 12, further comprising burning a hash of a third public key into a processor of the printing device during manufacturing of the printing device.

Aspect 14. The method of either one of aspect 12 or 13, further comprising storing a storage root key into the secure memory portion of the printing device during manufacturing of the printing device.

Aspect 15. The method of aspect 14, wherein loading the first private key into the secure memory portion includes:
storing at least a portion of the first private key in the secure memory portion,
encrypting the first private key using the storage root key, and
sending the encrypted first private key for storage external to the secure memory portion, and
wherein loading the second private key into the secure memory portion includes:
storing at least a portion of the second private key in the secure memory portion,
encrypting the second private key using the storage root key, and
sending the encrypted second private key for storage external to the secure memory portion.

Aspect 16. The method of any one of aspects 12-15, wherein loading the first private key into the secure memory portion includes storing an entire portion of the first private key into the secure memory portion, and
wherein loading the second private key into the secure memory portion includes storing an entire portion of the second private key into the secure memory portion.

Aspect 17. The method of any one of aspects 12-16, further comprising generating an attestation identity key and storing the attestation key into the secure memory portion of the printing device.

Aspect 18. The method of any one of aspects 12-17, wherein the printing device is a card printer.

Aspect 19. The method of any one of aspects 12-18, further comprising generating an attestation identity key and storing the attestation key into the secure memory portion of the printing device.

Aspect 20. A method of generating a unique and secure identity of a printing device during manufacturing of the printing device, the method comprising:
reading a unique printing device serial number associated with a component of the printing device,
sending the unique printing device serial number to a certificate authority,
receiving from the certification authority a certificate that is unique to the printing device containing the unique printing device serial number, and
loading the certificate to the printing device.

Aspect 21. The method of aspect 20, wherein the unique printing device serial number is placed in a common name field of the certificate.

Aspect 22. The method of either one of aspect 20 or 21, further comprising storing a key associated with the certificate into a secure memory portion of the printing device while the printing device is being manufactured.

Aspect 23. A method for performing an operation of a printing device, the method comprising:
a processor of the printing device receiving, from an external secondary device, data and an authorization request for validating authorization for the printing device to perform the operation;
retrieving a key corresponding to the operation stored in a secure memory portion of the printing device;
the processor determining whether the operation is authorized using the authorization request and the retrieved key;
the printing device performing the operation when the operation is authorized; and
the printing device performing a physical action on a customized personalization document.

Aspect 24. The method of aspect 23, wherein the operation is at least one of a printing device authentication operation, a supplies authentication operation, an authenticating a connection to a server operation, an encrypting payload data operation, a firmware modification operation; a print manager authentication operation; a modular device security authentication operation; a printing device configuration setting authentication operation; a print job source authentication operation; a configuration data source authentication operation; a secure boot operation; a Secure Sockets Layer/Transport Layer Security (SSL/TLS) authentication operation; a dual authentication operation; a private key storage authentication operation; and a file system encryption authentication operation.

Aspect 25. The method of either one of aspect 23 or 24, wherein the authorization request is a public key and the key is a private key.

The invention may be embodied in other forms without departing from the spirit or essential characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A printing device comprising:
a housing;
a card input in the housing;
a card travel path that extends through the housing from the card input;
a print engine disposed along the card travel path;
a non-secure memory portion; and
a secure memory portion that is an isolated memory portion and is distinct and/or separate from the non-secure memory portion, wherein the secure memory portion includes a crypto processor, wherein the secure memory portion stores a unique and secure identity of the printing device,
wherein the secure memory portion has access to at least one private key, each of the at least one private key associated with an operation performed by the printing device,
wherein the crypto processor validates an authorization request associated with a requested operation to be performed by the printing device using the at least one private key associated with the requested operation, and
wherein the printing device performs the requested operation upon validation by the crypto processor of the authorization request,
wherein the printing device stores at least one public key or cryptographic hash associated with a secure boot operation.

2. The printing device of claim 1, wherein the secure memory portion includes at least one factory established private key.

3. The printing device of claim 1, wherein the print engine performs at least one of retransfer printing, direct to card printing, ink jet printing, laser marking, and laser engraving on a card.

4. The printing device of claim 1, wherein the crypto processor identifies the at least one private key associated with the requested operation to be performed by the printing device.

5. The printing device of claim 1, wherein the crypto processor validates the authorization request by decrypting the requested operation using the authorization request and the at least one private key.

6. The printing device of claim 1, wherein the at least one private key stored in the secure memory portion is not accessible on a bus of the printing device.

7. The printing device of claim 1, wherein the non-secure memory portion and the secure memory portion are part of a single memory device with the secure memory portion isolated from the non-secure memory portion.

8. The printing device of claim 1, wherein the secure memory portion stores a storage root key that protects the at least one private key stored outside of the secure memory portion.

9. The printing device of claim 1, wherein the secure memory portion stores the at least one private key.

10. The printing device of claim 1, wherein the requested operation to be performed by the printing device includes at least one of: authentication of the printing device by a cloud server/service; authentication of supplies for use by the printing device; authentication of the printing device by a printer client using a printer protocol; authentication of signed firmware for modification; authentication of a print manager; authentication of a modular device security; authentication of a configuration setting of the printing device; authentication of a source of a print job and/or a configuration data; authentication of a secure and/or measured boot of the printing device; a Secure Sockets Layer/Transport Layer Security (SSL/TLS) authentication; authentication of a modular device security; a dual authentication; authentication of a private key storage; authentication of a file system encryption; and a payload encryption.

11. The printing device of claim 1, further comprising a printer functionality component that performs a physical action on a customized personalization document.

12. The printing device of claim 11, wherein the printer functionality component is at least one of:
a magnetic stripe station that reads and/or writes data on a magnetic stripe of a card; and
a chip programming station that reads and/or writes data on a chip of a card.

13. The printing device of claim 9, wherein the card is a financial or identification card and the printer functionality component includes a print engine that prints custom specific information onto the financial or identification card.

14. The printing device of claim 11, further comprising a second printer functionality component that performs a second physical action on the customized personalization document, wherein the second physical action is different than the first physical action.

15. The printing device of claim 1, further comprising:
a network input/output receives the authorization request from an external secondary device,
wherein the secure memory portion retrieves a particular private key of the at least one private key associated with the requested operation,
wherein the printing device determines whether the requested operation is validated using the authorization request and the retrieved particular private key, and
wherein the printing device performs the requested operation when the requested operation is validated.

16. The printing device of claim 15, wherein the authorization request is a public key.

17. The printing device of claim 15, wherein the crypto processor validates the authorization request using the authorization request and the at least one private key associated with the requested operation.

* * * * *